(12) United States Patent
Ohara et al.

(10) Patent No.: US 11,388,683 B2
(45) Date of Patent: Jul. 12, 2022

(54) USER EQUIPMENT

(71) Applicant: NTT DOCOMO, INC., Tokyo (JP)

(72) Inventors: Tomoya Ohara, Tokyo (JP); Ryosuke Osawa, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/968,791

(22) PCT Filed: Feb. 15, 2018

(86) PCT No.: PCT/JP2018/005358
§ 371 (c)(1),
(2) Date: Aug. 10, 2020

(87) PCT Pub. No.: WO2019/159305
PCT Pub. Date: Aug. 22, 2019

(65) Prior Publication Data
US 2020/0404595 A1    Dec. 24, 2020

(51) Int. Cl.
*H04W 52/34* (2009.01)
*H04W 76/16* (2018.01)
(Continued)

(52) U.S. Cl.
CPC ......... *H04W 52/34* (2013.01); *H04W 52/146* (2013.01); *H04W 52/362* (2013.01); *H04W 52/48* (2013.01); *H04W 76/16* (2018.02); *H04W 88/06* (2013.01)

(58) Field of Classification Search
CPC ... H04W 52/146; H04W 52/30; H04W 52/34; H04W 76/16
USPC .............................. 455/522, 69, 422.1, 67.11
See application file for complete search history.

(56) References Cited

U.S. PATENT DOCUMENTS

2017/0164410 A1   6/2017  Takeda et al.
2017/0303212 A1  10/2017  Takeda et al.
(Continued)

FOREIGN PATENT DOCUMENTS

JP         2016-19272 A    2/2016
KR      2017-0065505 A    6/2017

OTHER PUBLICATIONS

International Search Report issued in PCT/JP2018/005358 dated May 1, 2018 (4 pages).
Written Opinion of the International Searching Authority issued in PCT/JP2018/005358 dated May 1, 2018 (3 pages).
(Continued)

*Primary Examiner* — John J Lee
(74) *Attorney, Agent, or Firm* — Osha Bergman Watanabe & Burton LLP

(57) ABSTRACT

A user equipment communicates with a base station using a first RAT and a second RAT, including: a transmission unit to perform uplink transmission using the first RAT and the second RAT; a control unit to, if a sum of transmission powers of the uplink transmission via the first RAT and the second RAT exceeds a predetermined maximum transmission power, reduce the transmission power of the uplink transmission via the second RAT. If the sum exceeds a maximum transmission power and the transmission unit fails to transmit random access preamble via the second RAT and re-transmits the random access preamble, or if dynamic power sharing is not supported and the random access preamble is not transmitted via the second RAT in a slot where an uplink transmission via the first RAT is scheduled, the control unit changes transmission power control for the re-transmitted random access preamble from normal control.

6 Claims, 7 Drawing Sheets

(51) Int. Cl.
*H04W 52/14*     (2009.01)
*H04W 52/36*     (2009.01)
*H04W 52/48*     (2009.01)
*H04W 88/06*     (2009.01)

(56) References Cited

U.S. PATENT DOCUMENTS

2020/0275319 A1* 8/2020 Murray ............. H04W 36/0005
2020/0396701 A1* 12/2020 Yi .................... H04W 72/1242
2021/0084642 A1* 3/2021 Kim ................... H04W 72/048

OTHER PUBLICATIONS

3GPP TS 36.211 V14.5.0; "3rd Generation Partnership Project; Technical Specification Group Radio Access Network; Evolved Universal Terrestrial Radio Access (E-UTRA); Physical channels and modulation (Release 14)"; Dec. 2017 (197 pages).
3GPP TS 37.340 V1.2.0; "3rd Generation Partnership Project; Technical Specification Group Radio Access Network; Evolved Universal Terrestrial Radio Access (E-UTRA) and NR; Multi-connectivity; Stage 2 (Release 15)"; Oct. 2017 (50 pages).
Extended European Search Report issued in counterpart European Patent Application No. 18906083.3, dated Aug. 13, 2021 (8 pages).
TSG RAN WG1; "Response LS on power sharing for LTE-NR Dual connectivity"; 3GPP TSG RAN WG1 Meeting #90bis, R1-1719045; Prague, CZ; Oct. 9-13, 2017 (2 pages).
Office Action in counterpart Japanese Patent Application No. 2019-571900 dated Feb. 22, 2022 (5 pages).
Office Action in counterpart Korean Patent Application No. 10-2020-7026025 dated Mar. 31, 2022 (11 pages).

* cited by examiner

USER EQUIPMENT

TECHNICAL FIELD

The present invention relates to user equipment in a wireless communication system.

BACKGROUND ART

With Third Generation Partnership Project (3GPP), there is consideration of a wireless communication method called 5G or NR (New Radio) for further increasing system capacity, for further increasing data transmission speed, and for reducing latency in radio section, for example. In the following description, the wireless communication method may be referred to as "5G" or "NR." For 5G, various radio technologies are considered which satisfy a certain requirement, which is throughput of 10 Gbps or more and latency in radio section of 1 ms or less.

For NR, wireless communication using millimeter waves is under consideration. It is envisaged that a wide frequency range up to a higher frequency band than LTE (Long Term Evolution) is used. In particular, transmission losses are increased in a higher frequency range. Beam forming with narrow beam width is considered in order to compensate for the transmission losses (see Patent Document 1, for example).

In addition, for a NR system, the introduction of radio technology called LTE-NR dual connectivity or multi RAT (Multi Radio Access Technology) dual connectivity is considered, which is similar to the dual connectivity of an LTE system. With this radio technology, data is divided between a base station (eNB) of an LTE system and a base station (gNB) of an NR system, and the divided data are simultaneously transmitted/received by the base stations (see Patent Document 2, for example).

RELATED-ART DOCUMENTS

Non Patent Document

Non Patent Document 1: 3GPP TS 36.211 v14.5.0 (2017-12)

Non Patent Document 2: 3GPP TS 37.340 v1.2.0 (2017-10)

SUMMARY OF THE INVENTION

Problem to be Solved by the Invention

In LTE-NR dual connectivity, in the case of an initial access at NR side being performed, when the sum of LTE side transmission power and NR side transmission power exceeds a maximum transmission power, the transmission power for random access preambles may not be configured properly.

The present invention is made in light of such a problem and an object thereof is to configure, when an initial access is performed at NR side, a suitable transmission power for random access preambles in LTE-NR dual connectivity.

Means to Solve the Problem

According to the disclosed techniques, a user equipment is provided that communicates with a base station using a first RAT and a second RAT, the user equipment including: a transmission unit configured to perform uplink transmission using both the first RAT and the second RAT; a control unit configured to, if a sum of transmission power of the uplink transmission via the first RAT and transmission power of the uplink transmission via the second RAT exceeds a predetermined maximum transmission power, reduce the transmission power of the uplink transmission via the second RAT, wherein, in a case where the sum exceeds the predetermined maximum transmission power and the transmission unit fails to transmit random access preamble via the second RAT and re-transmits the random access preamble, or in a case where dynamic power sharing is not supported and the random access preamble is not transmitted via the second RAT in a slot in which a uplink transmission via the first RAT is scheduled, the control unit changes transmission power control for the re-transmitted random access preamble from normal transmission power control.

Effect of the Invention

According to the present disclosure, in LTE-NR dual connectivity, when the initial access is performed at NR side, a suitable transmission power can be configured for random access preambles.

MODES FOR CARRYING OUT THE INVENTION

In the following, embodiments of the present invention will be described with reference to the drawings. It should be noted that the following embodiments are merely exemplary, and the present invention may be applicable to other embodiments which are not described below.

The wireless communication system according to an embodiment of the present invention may use an existing technology as required. Such an existing technology may include, but is not limited to, LTE for example. The term. "LTE" as referred to herein shall have broad meaning and may include LTE-Advanced and its revisions (NR, for example) unless otherwise specifically defined.

In addition, in the following description of embodiments of the present invention, terms such as SS (Synchronization Signal), PSS (Primary SS), SSS (Secondary SS), PBCH (Physical broadcast channel), PRACH (Physical RACH), which are used for existing LTE, are referred to. These terms are used for ease of description. Signals, functions and the like similar to these may be called by other names.

Also, in the embodiment of the present invention, the duplex scheme may be a TDD (Time Division Duplex) scheme, an FDD (Frequency Division Duplex) scheme, or other scheme (for example, Flexible Duplex) may be used. Also, in the following description, the transmission of a signal with a transmission beam may be the transmission of a signal multiplied by a precoding vector (or a precoded signal with a precoding vector). Similarly, the reception of a signal with a reception beam may include multiplying the received signal with a predetermined weight vector. In addition, the transmission of a signal with a transmission beam may be represented as the transmission of the signal with a specific antenna port. In addition, the reception of a signal with a reception beam may be represented as the reception of the signal with a specific antenna port. The antenna port refers to a logical antenna port or a physical antenna port defined in 3GPP specifications. In addition, the forming of a transmission beam and a reception beam is not limited to the above-mentioned methods. For example, the forming of a transmission beam and a reception beam may be performed in a base station 100 or a user equipment 200 with multiple antennas by changing angle of respective antennas, or by the combination of precoding vectors and changed antenna angles, or by switching of different antenna panels, or by the combination of multiple antenna panels used together, or by any other suitable method. In addition, for example, in a high frequency range, mutually different multiple transmission beams may be used. The use of multiple transmission beams may be referred to as multi-beam operation; while the use of a single transmission beam may be referred to as a single-beam operation.

Figure 1:
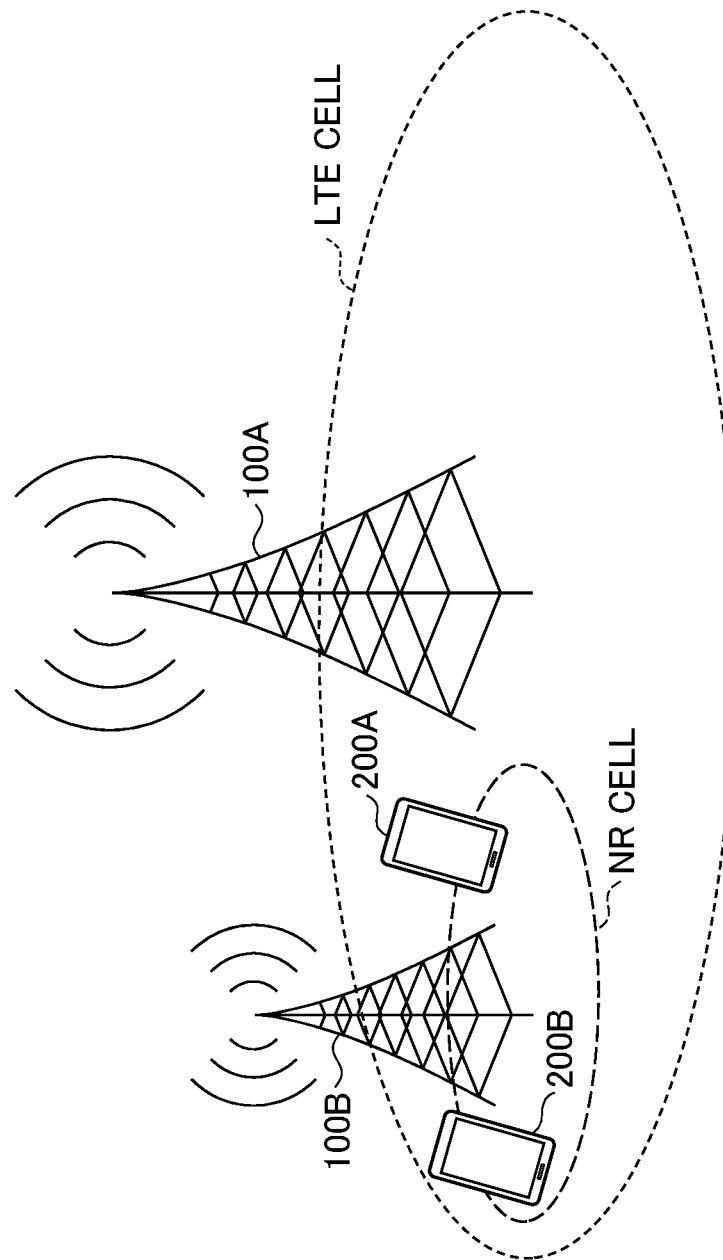
FIG. 1 is a schematic drawing showing an exemplary structure of a wireless communication system according to an embodiment.

FIG. 1 is a schematic drawing for explaining a communication system according to an embodiment of the present invention. The wireless communication system according to an embodiment of the present invention may include a base station 100 and a user equipment 200 as shown in FIG. 1. In FIG. 1, two of each of the base stations 100 and the user equipment 200 are shown, but any number of base station 100 and any number of user equipment 200 may be included in the system.

A base station 100 is a communication apparatus to provide one or more cells to wirelessly communicate with a user equipment 200. For example, as shown in FIG. 1, the base station 100A may provide a LTE cell and the base station 100 may provide a NR cell (hereinafter, they are referred to as "base station 100" unless otherwise discriminated).

The base station 100B is a communication apparatus to provide one or more NR cells to wirelessly communicate with the user equipment 200. When the base station 100B communicates via NR with the user equipment 200, it may use Dual Connectivity, where the base station 100A and the base station 100B can communicate with the user equipment 200 in parallel. The base station 100B and the user equipment 200 both may perform beamforming to transmit/receive signals.

The user equipment 200A and the user equipment 200B (hereinafter may be referred to as "user equipment 200" unless otherwise discriminated) may be a smart phone, a cell phone, a wearable terminal, or a communication device with wireless communication function such as M2M (Machine-to-Machine) communication module, for example. They may be wirelessly connected to the base station 100A or the base station 100B to utilize various types of communication services provided by the wireless communication system. When the user equipment 200 performs initial access or returns to wireless communication, the user equipment 200 transmits a preamble signal for random access to the base station 100 and starts random access procedure. This random access is based on broadcast information via PBCH and broadcast information via PDSCH (Physical downlink shared channel) received from the base station 100. The user equipment 200 may start connection to the base station 100B based on information obtained from the base station 100A. In addition, the user equipment 200 may start connection with the base station 100B based on information obtained from the base station 100B without connection with the base station 100A.

Transmission power during LTE-NR dual connectivity may be controlled by "LTE-NR power sharing" (hereinafter referred to as "LTE-NR power sharing"). The maximum transmission power for LTE, $P_{LTE}$, the maximum transmission power for NR, $P_{NR}$, and the sum of the maximum transmission powers for LTE and NR, $P_{total}$, may be independently notified to the user equipment 200, or may be predetermined.

If $P_{LTE}+P_{NR}>P_{total}$, the user equipment 200 supporting LTE-NR power sharing and "Dynamic power sharing" reduces NR-side transmission power such that $P_{LTE}+P_{NR}$ does not exceed $P_{total}$. In addition, the mathematical relation $P_{LTE}+P_{NR}>P_{total}$ is merely an example. Any mathematical relation which expresses the sum of the transmission power for LTE and the transmission power for NR exceeding a certain upper limit including additional adjusting parameters may be used.

On the other hand, a user equipment 200 which does not support dynamic power sharing does not perform, at NR side, Uplink (UL) transmission in a slot where a UL transmission is scheduled at LTE side. That is, the user equipment 200 performs, in the same slot, UL transmission at either LTE side or NR side.

In addition, the user equipment 200 may perform power ramping for NR as well as LTE, in which the user equipment 200 increases transmission power by a notified or predefined value when re-transmitting preambles via PRACH. However, when the user equipment 200 performs preamble re-transmission via PRACH using a different transmission beam from a previous preamble transmission via PRACH, the user equipment 200 may perform preamble re-transmission via PRACH for NR using the same transmission power as the previous preamble transmission via PRACH without power ramping. In addition, when the user equipment 200 performs preamble re-transmission via PRACH for NR with a different selected SS block from a previous preamble transmission via PRACH, the user equipment 200 may perform the preamble re-transmission via PRACH using the same transmission power as the previous preamble transmission via PRACH without performing power ramping. It is noted that the SS block is a signal including a synchronization signal and a part of system information and that the SS block is used for robustness estimation for PRACH transmission power calculation and RACH resource selection.

Herein, "performing power ramping" includes incrementing "PREAMBLE_POWER_RAMPING_COUNTER" (hereinafter referred to as "ramping counter") in MAC layer of the user equipment 200 by one to compute PRACH transmission power based on the ramping counter.

The PHY layer (physical layer) of the user equipment 200 identifies whether a different transmission beam from the previous transmission is used. Thus, if "notification of suspending power ramping counter" is notified from PHY layer to MAC layer, the ramping counter is suspended not to perform power ramping.

Figure 2:
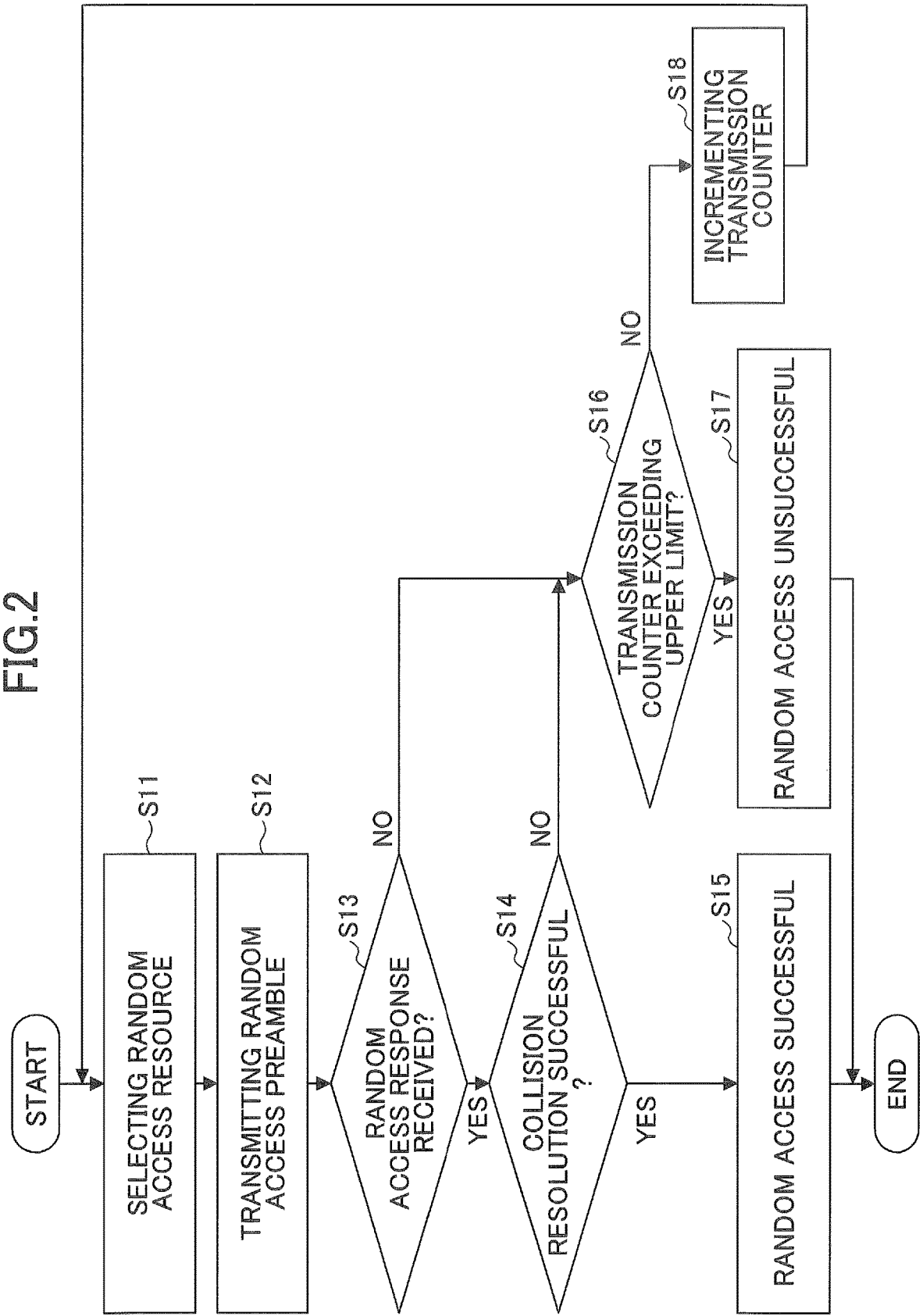
FIG. 2 is a flow chart showing an exemplary procedure of random access according to an embodiment.

FIG. 2 is a flow chart showing an exemplary procedure of random access according to an embodiment. FIG. 2 shows an example of random access procedure. The base station 100 may transmit PSS, SSS and PBC to the user equipment 200. PBCH may include a part of system information. In addition, a transmission counter is set to "1" at the beginning of the random access procedure.

In step S11, the user equipment 200 selects a resource used for random access based on resources for performing the random access procedure received from the base station 100, that is, a RACH resource specified in frequency domain and time domain and information specifying preamble format, for example. Then, the user equipment 200 transmits a random access preamble using the selected resource (S12). The transmission power setting for the random access preamble will be described later.

In step S13, the base station 100 transmits a random access response to the user equipment 200. The random access response is a response to the random access preamble. It is transmitted with respect to a RA-RNTI (Random Access-Radio Network Temporary Identifier) destination via PDCCH, and includes at least the identification of the random access preamble, timing alignment, initial Uplink grant, and temporary C-RNTI (Temporary Cell-Radio Network Temporary Identifier). If the user equipment 200 receives the random access response (YES in S13), the process proceeds to step S14, and if the user equipment 200 does not receive the random access response (NO in S13), the process proceeds to step S16.

In step S14, the user equipment 200 performs uplink transmission based on uplink grant included in the random access response. In uplink transmission, at least RRC (Radio Resource Control) connection request and NAS (Non-Access Stratum) UE (User Equipment) identifier are transmitted. Then, control information for establishing RRC connection and a predetermined MAC (Medium Access Control) control element are transmitted from the base station 100 to the user equipment 200 with respect to a temporary C-RNTI destination via PDCCH. The MAC control element may be used for contention resolution. In addition, the contention resolution (step S14) may be performed in collision type random access procedure, and may not be performed in non-collision type random access procedure. If the MAC control element matches some or all of data transmitted (YES in step S14), the user equipment 200 proceeds to step S15, and proceeds to step S16 otherwise (NO in step S14).

In step S15, the user equipment 200 determines that the random access succeeded and sets the temporary C-RNTI, if used, as C-RNTI. Then, the user equipment 200 ends the random access procedure.

In step S16, the user equipment 200 determines whether the transmission counter exceeds upper limit notified or predefined. The process proceeds to step S17 if the transmission counter exceeds the upper limit (YES in S16), and to step S18 otherwise (NO in S16).

In step S17, the user equipment 200 determines that random access failed, and terminates the random access procedure. On the other hand, in step S18, the user equipment 200 increments the transmission counter by one, returns to step S11 in order to re-transmit a random access preamble, and selects a random access resource again.

Figure 3:
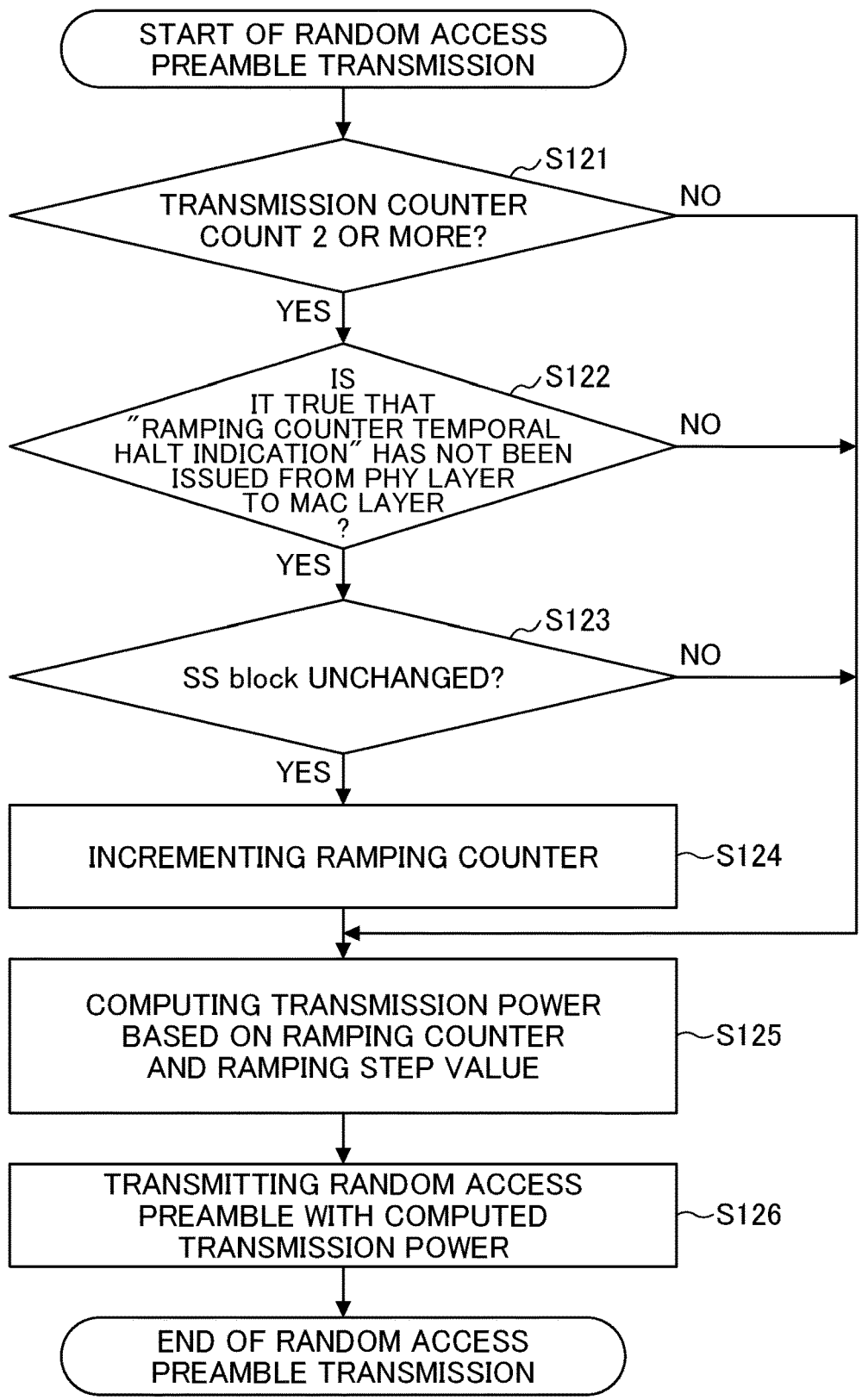
FIG. 3 is a flow chart showing an exemplary procedure of preamble transmission according to an embodiment.

FIG. 3 is a flow chart showing an exemplary procedure of preamble transmission according to an embodiment. Referring to FIG. 3, the random access preamble transmission in step S12 in FIG. 2 is described in detail. In addition, a ramping counter is set to "1" at the beginning of the random access procedure.

In step S121, the user equipment 200 determines whether the transmission counter count is two or more. That is, a determination is made whether the transmission of a random access preamble is the second one or later. If the transmission counter indicates two or more (YES in S121), the process proceeds to step S122. If the transmission counter indicates one or less (NO in S121), the process proceeds to step S125.

In step S122, the user equipment 200 determines whether "notification of suspending power ramping counter" has not been issued from PHY layer to MAC layer. If not issued (YES in S122), the process proceeds to step S123. The process proceeds to step S125 if the notification has been issued (NO in S122).

In step S123, the user equipment 200 determines whether the SS block has been changed since the last preamble transmission. If not changed (YES in S123), the process proceeds to step S124. The process proceeds to step S125 if changed (NO in S123).

In step S124, the user equipment 200 increments the ramping counter by one.

In step S125, the user equipment 200 computes transmission power for transmitting the random access preamble based on the ramping counter and a ramping step value. For example, the transmission power for random access preamble transmission may be computed based on a value of (ramping counter count−1)*(ramping step value). That is, the increase of transmission power by ramping is not performed at the first random access preamble transmission, and then, at the second time or later, the transmission power is increased by the ramping step value. Then, the user equipment 200 transmits a random access preamble using the computed transmission power (S126).

In the case that the transmission power at NR side is limited and reduced according to LTE-NR power sharing in LTE-NR dual connectivity, if the random access preamble transmission results in failure in the case where the random access preamble is tried to transmit via NR-PRACH, based on the reduced transmission power, the ramping counter is incremented by one at re-transmission. In addition, if UL transmission is not performed at LTE side or performed at a low transmission power during the random access preamble re-transmission via NR-PRACH, the transmission power at NR side may not be limited or be reduced by a small amount.

Thus, when the user equipment 200 re-transmits the random access preamble via NR-PRACH, the transmission power may be the transmission power which has not been reduced plus the ramping step, leading to unnecessarily increased transmission power, which may result in increased interference to environment.

Alternatively, in a user equipment 200 which does not support dynamic power sharing, in a case of PRACH transmission not being performed at NR side in a slot where UL transmission is scheduled at LTE side, the MAC layer may recognize that PRACH transmission is performed, and the ramping step may be added to the transmission power at the re-transmission of random access preamble via NR-PRACH.

In addition, the NR-PRACH transmission increments the transmission counter by one. The user equipment 200 determines the maximum number of re-transmissions of a random access preamble based on the transmission counter. Thus, the maximum number of re-transmissions may be reached by the transmission of random access preambles via NR-PRACH based on the reduced transmission power according to LTE-NR power sharing. If the user equipment 200 determines that the random access procedure failed due to the maximum re-transmission number having been reached, it takes time for the next random access procedure to start, which may result in an increased latency.

A novel procedure of controlling power for transmission of random access preamble via NR-PRACH, to be used in step S125 in FIG. 3, is described with reference to FIGS. 4 and 5.

Figure 4:
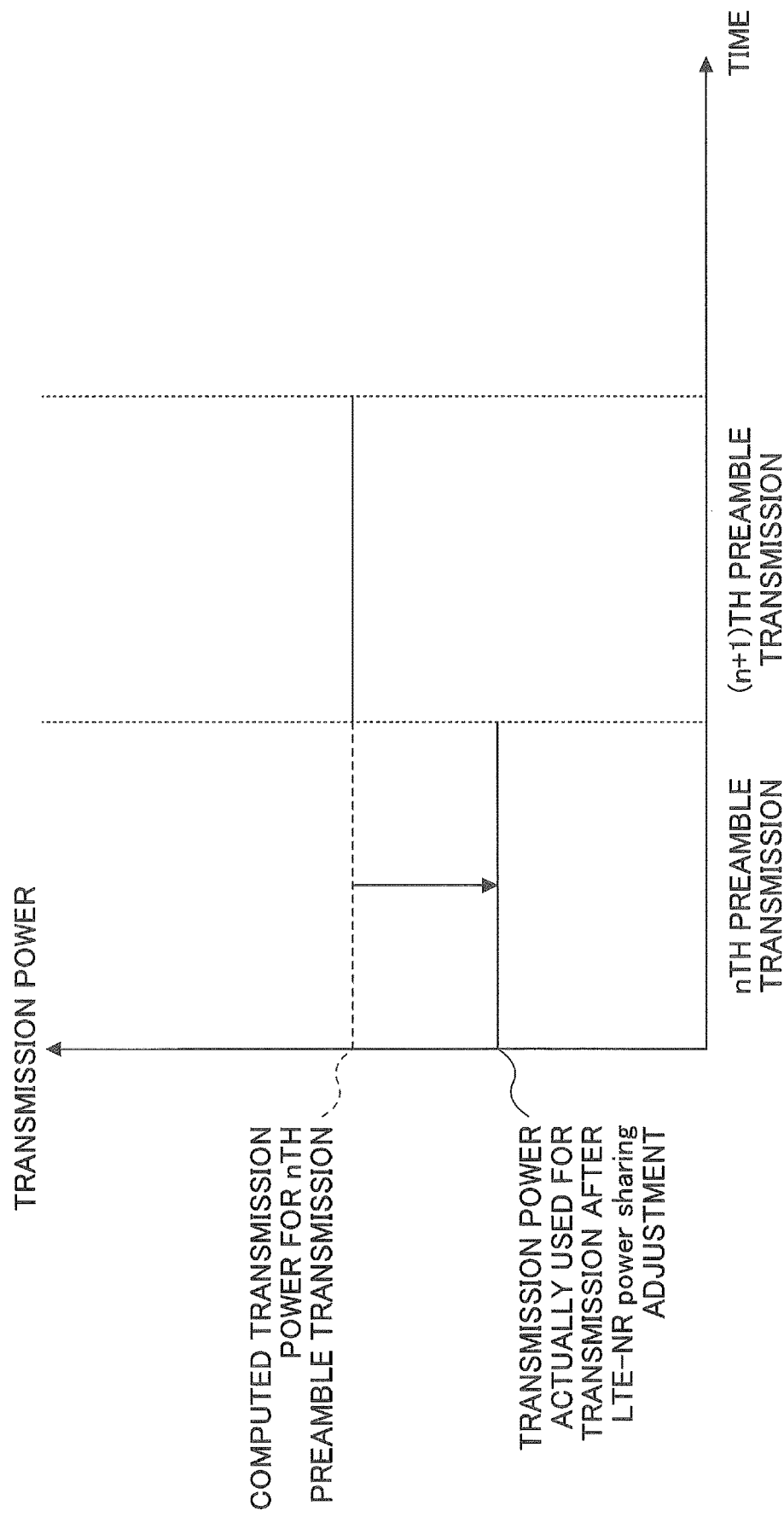
FIG. 4 is a schematic drawing for explaining the first example of an exemplary preamble transmission power according to an embodiment.

FIG. 4 is a drawing for explaining a first example of an exemplary preamble transmission power according to an embodiment. The user equipment 200 does not perform power ramping at the re-transmission of a random access preamble via NR-PRACH if the user equipment 200 has transmitted a random access preamble with reduced transmission power at NR side according to LTE-NR power sharing of LTE-NR dual connectivity. In addition, the user equipment 200 does not perform power ramping at the re-transmission of a random access preamble via NR-PRACH if the user equipment, which does not support dynamic power sharing, does not perform PRACH transmission at NR side in a slot where UL transmission is scheduled at LTE side.

As shown in FIG. 4, at the nth preamble transmission, transmission power actually used has been reduced from the computed transmission power for the nth preamble transmission according to the LTE-NR power sharing. If the nth preamble transmission fails, a preamble may be transmitted as the (n+1)th preamble transmission using transmission power computed for the nth preamble transmission without power ramping.

If the user equipment 200 has transmitted a preamble in a state in which transmission power at NR side is limited according to LTE-NR power sharing, power ramping may not be performed in accordance with issuing of "notification of suspending power ramping counter" from PHY layer to MAC layer as described with reference to step S122 of FIG. 3.

In addition, if preamble transmission has been performed with transmission power at NR side limited according to LTE-NR power sharing, power ramping may be skipped by notifying information indicating whether transmission power is limited or not to MAC layer. For example, the information indicating whether transmission power is limited or not may be notified from PHY layer to MAC layer.

Furthermore, if a preamble has been transmitted with transmission power at the NR side limited according to LTE-NR power sharing, the user equipment 200 may not increment the transmission counter by one. The operation not to increment the transmission counter by one may be notified from PHY layer to MAC layer along with "notification of suspending power ramping counter," or "notification of suspension" may be transmitted from PHY layer to MAC layer, separately from transmission counter.

Figure 5:
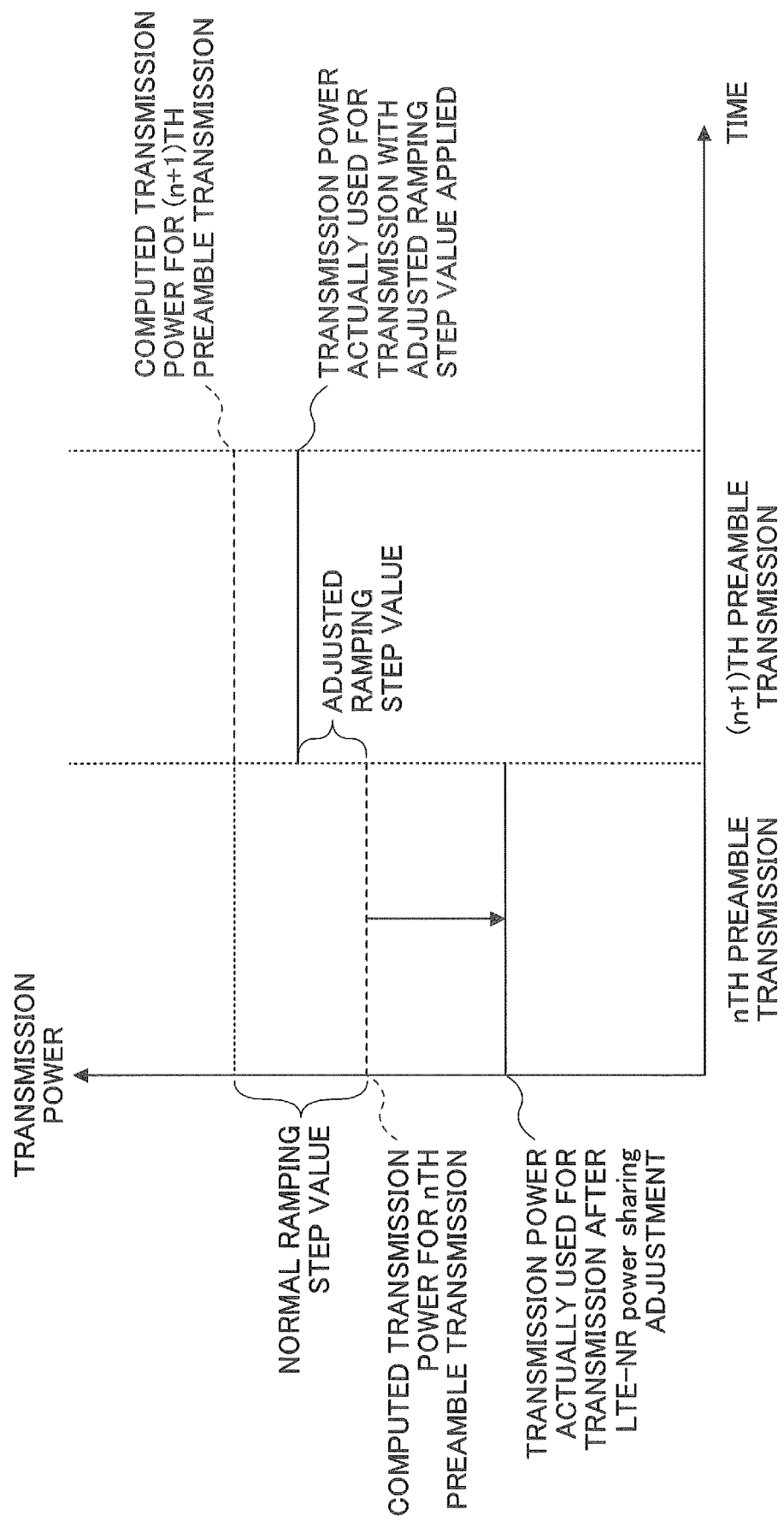
FIG. 5 is a schematic drawing for explaining the second example of an exemplary preamble transmission power according to an embodiment.

FIG. 5 is a drawing for explaining a second example of an exemplary preamble transmission power according to an embodiment. The user equipment 200 may change ramping step value at the re-transmission via NR-PRACH if the user equipment 200 has transmitted a random access preamble with reduced transmission power according to LTE-NR power sharing of LTE-NR dual connectivity, or if a user equipment not supporting dynamic power sharing does not perform PRACH transmission at NR side in a slot where UL transmission is not scheduled at LTE side.

As shown in FIG. 5, at the nth preamble transmission, transmission power actually used has been reduced from the computed transmission power for the nth preamble transmission according to the LTE-NR power sharing. If the nth preamble transmission is unsuccessful, the user equipment 200 may transmit a preamble with transmission power adjusted with a power ramping step value adjusted differently from a usual power ramping step value at the (n+1)th preamble transmission.

For example, the adjusted power ramping step value may be notified to the user equipment 200 separately from the usual power ramping step value or may be predefined. The notified or predefined adjusted power ramping step value may be a relative value with respect to the usual power ramping step value. In addition, the adjusted power ramping step value may be notified or predefined based on limited or reduced transmission power at NR side. For example, if transmission power at NR side is reduced by X dB, the value of X may determine the adjusted power ramping step value. For example, the more X is, the less the power ramping step value is; and the less X is, the more the power ramping step value is. In addition, for example, if transmission power at NR side is reduced such that PRACH is transmitted by Y dBm, the value of Y may determine the adjusted power ramping step value. For example, the less Y is, the less the power ramping step value is; and the more Y is, the more the power ramping step value is.

If the user equipment 200 transmits a random access preamble via NR-PRACH with reduced transmission power at NR side according to LTE-NR power sharing in LTE-NR dual connectivity, and if transmission power value actually used for the transmission has been reduced and is less than a predetermined threshold, the user equipment 200 may not perform power ramping upon the random access preamble re-transmission via NR-PRACH or may change a ramping step value for the power ramping. In addition, the threshold applied to the actual transmission power may be specified as the absolute value of power, and may be further adjusted based on a path loss estimation at the user equipment 200. For example, the greater the path loss estimation is, the higher the threshold is, and the smaller the path loss estimation is, the lower the threshold is.

In addition, if the user equipment 200 transmits random access preamble via NR-PRACH with reduced transmission power at NR side according to LTE-NR power sharing in LTE-NR dual connectivity, and if the reduced transmission power value is more than a predetermined threshold, the user equipment 200 may not perform power ramping upon the random access preamble re-transmission via NR-PRACH or may change a ramping step value for the power ramping. In addition, the threshold compared to the reduced transmission power may be specified as a relative value of power, and may be further adjusted based on a path loss estimation at the user equipment 200. For example, the greater the path loss estimation is, the higher the threshold is, and the smaller the path loss estimation is, the lower the threshold is.

If the transmission power at NR side is reduced according to LTE-NR power sharing of LTE-NR dual connectivity, the PHY layer of the user equipment 200 may refrain from transmitting the random access preamble via NR-PRACH. The PHY layer may notify the MAC layer that the random access preamble is not transmitted via NR-PRACH.

Furthermore, in the case that the transmission power is reduced at NR side according to LTE-NR power sharing of LTE-NR dual connectivity, if the reduced transmission power that is applied to an actual transmission is less than a threshold value, or if the transmission power is reduced by an amount greater than a predetermined threshold value, the PHY layer of the user equipment 200 may refrain from transmitting the random access preamble via NR-PRACH.

In addition, in LTE-NR dual connectivity, if $P_{LTE}+P_{NR}>P_{total}$ holds, assuming $P_{LTE}$ representing the maximum LTE transmission power, $P_{NR}$ representing the maximum NR transmission power, $P_{total}$ representing the maximum total transmission power of LTE and NR, the user equipment 200 may prioritize allocation of transmission power for NR upon transmission via NR-PRACH. That is, the user equipment 200 may have transmission power at LTE side reduced upon transmission via NR-PRACH. If PRACH is transmitted at LTE side and NR side, the user equipment 200 may reduce transmission power of PRACH at NR side.

As discussed above, if the user equipment 200 is not notified whether transmission power at NR side is reduced or not according to LTE-NR power sharing, the user equipment 200 can control transmission power of the random access preamble transmitted at an initial access in a suitable manner. In addition, in the case that NR side transmission power is restricted according to LTE-NR power sharing, the user equipment 200 may control the transmission power of the random access preamble at the initial access in a suitable manner by refraining from power ramping. In addition, in the case that NR side transmission power is restricted according to LTE-NR power sharing, the user equipment 200 may control the transmission power of the random access preamble at the initial access in a suitable manner by adjusting the ramping step value based on an amount that restricts the transmission power at NR side.

That is, in LTE-NR dual connectivity, when the initial access is performed at NR side, a suitable transmission power can be configured for random access preambles.

<Device Configuration>

The configuration of the base station 100 and the user equipment 200 which perform the aforementioned processing and operation is described below. The base station 100 and the user equipment 200 may have functions to perform the exemplary embodiments described above. However, the base station 100 and the user equipment 200 may have functions to perform some, not all, of the exemplary embodiments.

<Base Station 100>

Figure 6:
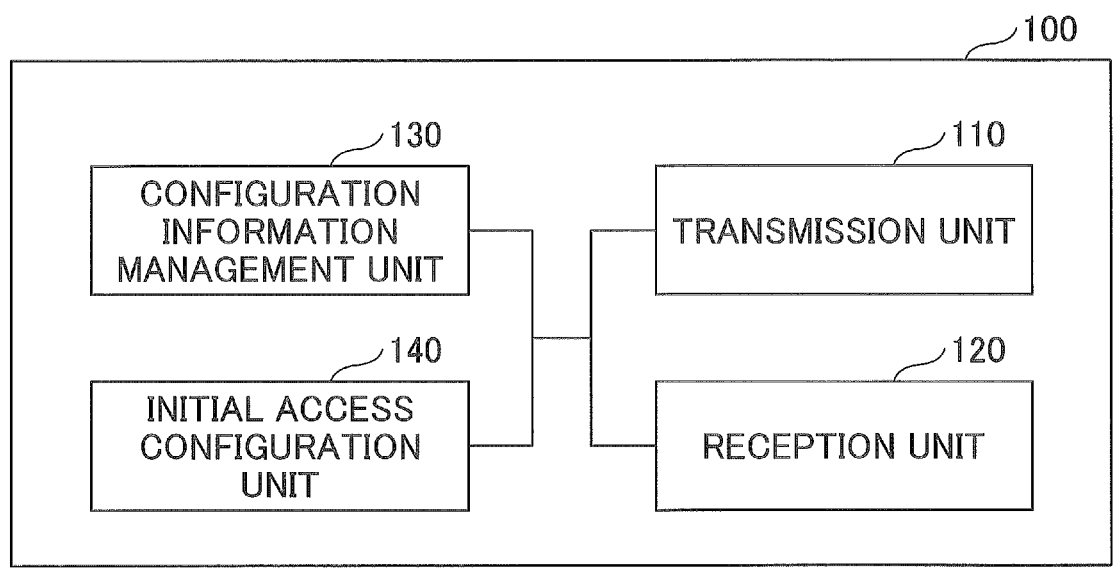
FIG. 6 is a schematic drawing showing an exemplary functional structure of a base station 100 according to an embodiment.

FIG. 6 shows an exemplary functional structure of the base station 100. As shown in FIG. 6, the base station 100 includes transmission unit 110, reception unit 120, configuration information management unit 130, and initial access configuration unit 140. The functional structure shown in FIG. 6 is merely exemplary. As long as the functional sections and functional units can implement the operation according to the present embodiments the names of the functional sections and functional units do not matter.

The transmission unit 110 may include functions to generate and wirelessly transmit a signal to be transmitted to the user equipment 200. The reception unit 120 may include functions to receive various signals from the user station 200, and to extract upper layer information from the received signal, for example. In addition, the transmission unit 110 may have functions to transmit signals such as NR-PSS, NR-SSS, NR-PBCH, and DL/UL control signal. In addition, the transmission unit 110 may transmit broadcast information including information used for initial access or UL scheduling; the reception unit 120 may receive RACH preamble from the user station 200.

The configuration information management unit 130 may store preset configuration information and other various configuration information to be transmitted to the user equipment 200. The configuration information may include, for example, information related to transmission/reception parameters of initial access.

The initial access configuration unit 140 may notify the user equipment 200 of information used for the initial access, and perform processing at reception of random access preamble transmitted from the user equipment 200 and transmission of the random access response, for example.

<User Equipment 200>

Figure 7:
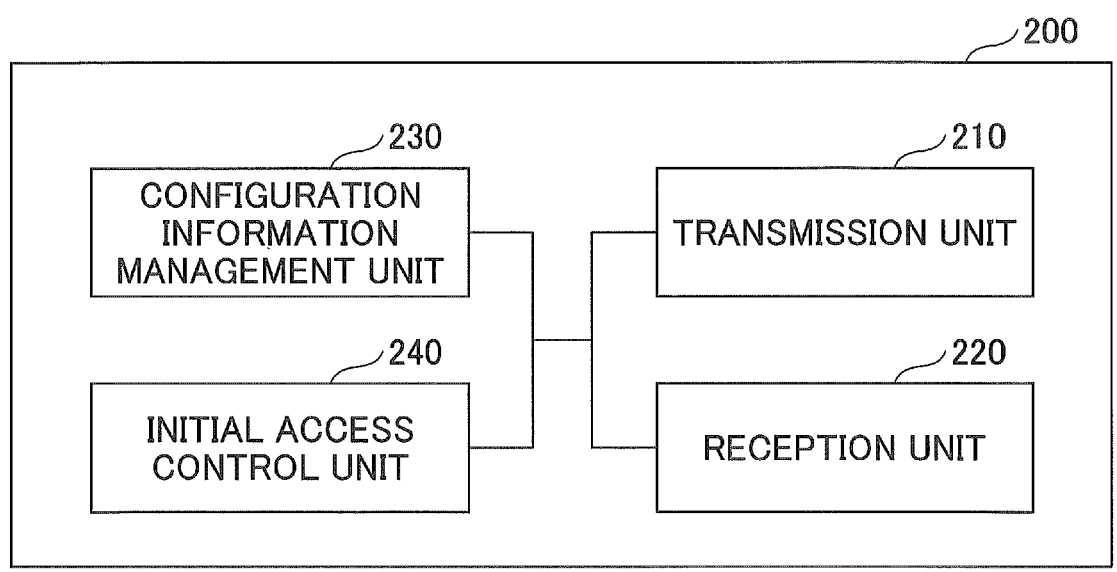
FIG. 7 is a schematic drawing showing an exemplary functional structure of a user equipment 200 according to an embodiment.

FIG. 7 shows an exemplary functional structure of the user device 200. As shown in FIG. 7, the user equipment 200 includes transmission unit 210, reception unit 220, configuration information management unit 230, and initial access control unit 240. The functional structure shown in FIG. 7 is merely exemplary. As long as the functional sections and functional units can implement the operation according to the present embodiments their names are do not matter.

The transmission unit 210 generates a transmission signal from the transmission data and transmits the transmission signal wirelessly. The reception unit 220 receives various signals wirelessly, and extract upper layer signals from the received PHY layer signals. In addition, the reception unit 220 may have functions to receive signals such as NR-PSS, NR-SSS, NR-PBCH, and DL/UL control signal. In addition, the transmission unit 210 has function to transmit NR-PRACH and NR-PUSCH, for example.

The configuration information management unit 230 stores various configuration information received from the base station 100 or the user equipment 200. In addition, the configuration information management unit 230 further stores preset configuration information. The configuration information may include, for example, information related to transmission/reception parameters of initial access.

The initial access control unit 240 generates preamble and message related to an initial access to be transmitted from the user equipment 200 to the base station 100 as described with reference to the embodiment. In addition, the initial access control unit 240 controls transmission power for the preamble associated with the initial access. Functions related to signal transmission of the initial access control unit 240 may be included in the transmission unit 210, and functions related to signal reception of the initial access control unit 240 may be included in the reception unit 220.

<Hardware Configuration>

The functional structure (shown in FIGS. 6 and 7) used for explaining the embodiments of the present invention shows individual functional blocks. These functional blocks (configuration units) may be implemented by an arbitrary combination of hardware and/or software. In addition, means for implementing each functional block are not limited. That is, each functional block may be implemented by a single device in which multiple elements are physically and/or logically combined or by two or more devices physically and/or logically separated but directly and/or indirectly connected (wired and/or wireless, for example).

Figure 8:
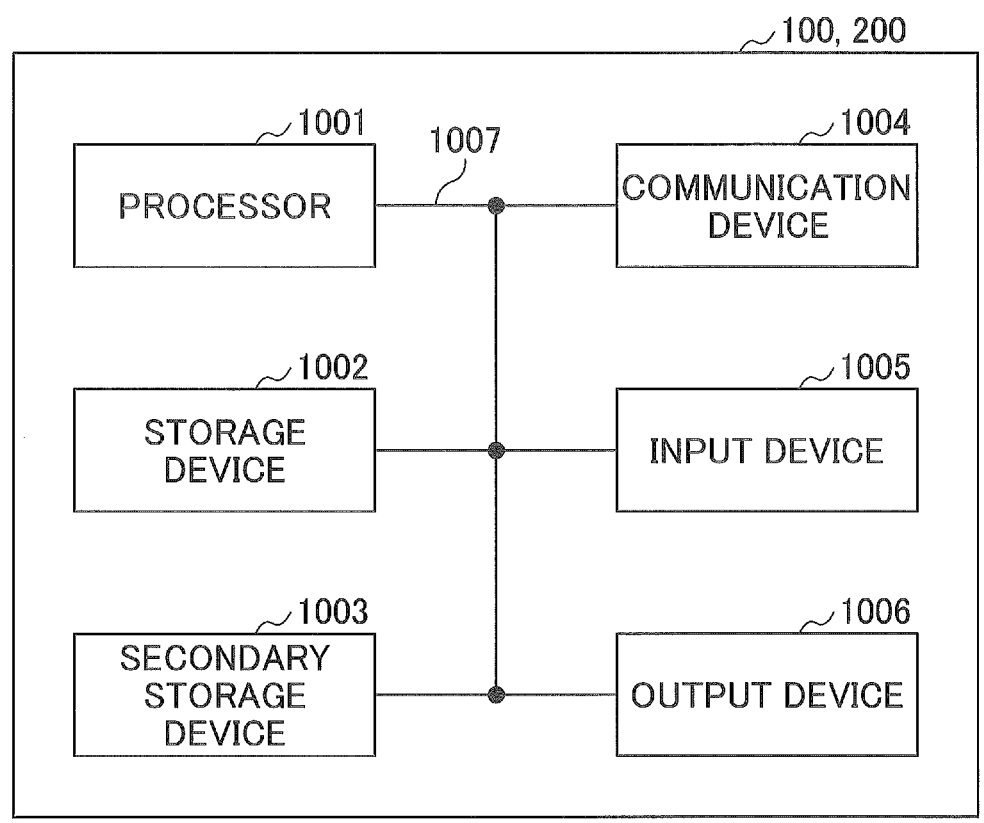
FIG. 8 is a schematic drawing showing an exemplary hardware structure of the base station 100 or the user equipment 200 according to an embodiment.

In addition, for example, the base station 100 and user equipment 200 both may function as a computer which performs processing according to the embodiment of the present invention. FIG. 8 is a schematic drawing showing an exemplary hardware structure of a wireless communication device which may be the base station 100 or the user equipment 200 according to an embodiment of the present invention. The aforementioned base station 100 and the user equipment 200 each may physically implemented as a computer device including a processor 1001, a storage device 1002, a secondary storage device 1003, a communication device 1004, an input device 1005, an output device 1006, and a bus 1007, for example.

In the following description, the term "device" may be replaced with circuit, apparatus, or unit, for example. The hardware configuration of the base station 100 and user equipment 200 may be configured to include one or more of the units designated by 1001-1006, and may be configured without some of the units.

Each function of the base station 100 and user equipment 200 may be implemented by the processor 1001 performing operations and controlling the communication of the communication device 1004 and data read/write of the storage device 1002 and the secondary storage device 1003 using predetermined software (program) loaded into hardware such as the processor 1001 and storage device 1002.

The processor 1001 may, for example, control the entire computer by running an operating system. The processor 1001 may be configured by a central processing unit (CPU) including an interface with peripherals, a control unit, a calculation unit, a register, and the like.

The processor 1001 reads a program (program codes), a software module, or data from the secondary storage device 1003 and/or the communication unit 1004 to the storage device 1002 and performs various processes in accordance therewith. As the program, a program causing a computer to perform at least a part of the operations described above in the embodiment is used. For example, the transmission unit 110, reception unit 120, configuration information management unit 130, and initial access configuration unit 140 of the base station 100 shown in FIG. 6 may be embodied by control programs which are stored in the storage device 1002 and run on the processor 1001. For example, the transmission unit 210, reception unit 220, configuration information management unit 230, and initial access control unit 240 of the user equipment 200 shown in FIG. 7 may be embodied by control programs which are stored in the storage device 1002 and run on the processor 1001. It is described that the aforementioned various processing is performed by a single processor 1001, the processing may be performed by two or more processors 1001 simultaneously or serially. The processor 1001 may be implemented by one or more chips. The program may be transmitted from the network via a telecommunication circuit.

The storage device 1002 is a computer-readable recording medium and may be constituted, for example, by at least one of a read only memory (ROM), an erasable programmable ROM (EPROM), an electrically erasable programmable ROM (EEPROM), and a random access memory (RAM). The storage device 1002 may be referred to as a register, a cache, or a main memory (a main storage unit). The storage device 1002 can store a program (program codes), a software module, data, or the like which can be used to perform the processes according to the embodiment of the invention.

The secondary storage device 1003 is a computer-readable recording medium and may be constituted, for example, by at least one of an optical disc such as a compact disc ROM (CD-ROM), a hard disk drive, a flexible disk, a magneto-optical disk (such as a compact disk, a digital versatile disk, or a Blu-ray (registered trademark) disk), a smart card, a flash memory (such as a card, a stick, or a key drive), a floppy (registered trademark) disk, and a magnetic strip. The secondary storage device 1003 may be referred to as an auxiliary storage device. Examples of the recording medium may include a database including the storage device 1002 and/or the secondary storage device 1003, a server, and another appropriate medium.

The communication unit 1004 is hardware (a transceiver device) that allows communication between computers via a wired and/or wireless network and is referred to as, for example, a network device, a network controller, a network card, or a communication module. For example, the transmission unit 110 and reception unit 120 of the base station 100 may be embodied as the communication device 1004. In addition, the transmission unit 210 and reception unit 220 of the base station 200 may be embodied as the communication device 1004.

The input unit 1005 is an input device (such as a keyboard, a mouse, a microphone, a switch, a button, or a sensor) that receives an input from the outside. The output unit 1006 is an output device (such as a display, a speaker, or an LED lamp) that performs outputting to the outside. The input unit 1005 and the output unit 1006 may be configured as a unified body (such as a touch panel).

The units such as the processor 1001 and the storage device 1002 are connected to each other via the bus 1007 for transmitting and receiving information. The bus 1007 may be constituted by a single bus or may be configured by different buses for the units.

The base station 100 and the user equipment 200 may be configured to include hardware such as a microprocessor, a digital signal processor (DSP), an application specific integrated circuit (ASIC), a programmable logic device (PLD), or a field programmable gate array (FPGA) or a part or all of the functional blocks may be embodied by the hardware. For example, the processor 1001 may be implemented as at least one hardware module.

Summary of Embodiments

As described above, according to the embodiment of the present invention, a user equipment is provided, which communicates with a base station using a first RAT and a second RAT, the user equipment comprising: a transmission unit to perform uplink transmission using both the first RAT and the second RAT; a control unit that, if a sum of transmission power of the uplink transmission via the first RAT and transmission power of the uplink transmission via the second RAT exceeds a predetermined maximum transmission power, reduces the transmission power of the uplink transmission via the second RAT, wherein, in a case that the sum exceeds the predetermined maximum transmission power, if the transmission unit fails to transmit a random access preamble via the second RAT and re-transmits the random access preamble, or if dynamic power sharing is not supported and the random access preamble is not transmitted via the second RAT in a slot in which an uplink transmission via the first RAT is scheduled, the control unit changes transmission power control for the re-transmitted random access preamble.

According to the arrangement discussed above, if the transmission power at NR side is restricted according to LTE-NR power sharing, the user equipment 200 can control transmission power of the random access preamble transmitted at an initial access in a suitable manner. That is, in LTE-NR dual connectivity, when the initial access is performed at NR side, a suitable transmission power can be configured for random access preambles.

If the sum exceeds the predetermined maximum power, the control unit may not increase transmission power for the re-transmitted random access preamble. According to the above arrangement, in the case that NR side transmission power is restricted according to LTE-NR power sharing, the user equipment 200 may control the transmission power of the random access preamble at the initial access not to unnecessarily increase transmission power by refraining from power ramping.

If the sum exceeds the predetermined maximum power, and the control unit does not increase transmission power for the re-transmitted random access preamble, a transmission counter for the random access preamble may not increase a count number. According to the arrangement discussed above, if the transmission power at NR side is restricted according to LTE-NR power sharing, the user equipment 200 can control the number of transmissions of the random access preamble transmitted at an initial access in a suitable manner to reduce the latency related to the initial access.

If the sum exceeds the predetermined maximum power, the control unit may determine transmission power for the re-transmitted random access preamble using a power ramping step value different from a normal power ramping step value. According to the above arrangement, in the case that NR side transmission power is restricted according to LTE-NR power sharing, the user equipment 200 may control the transmission power of the random access preamble at the initial access in a suitable manner by adjusting the power ramping step value.

The different power ramping step value may be determined based on the reduced uplink transmission power via the second RAT or its reduction range. According to the above arrangement, in the case that NR side transmission power is restricted according to LTE-NR power sharing, the user equipment 200 may control the transmission power of the random access preamble at the initial access in a suitable manner by adjusting the ramping step value based on an amount that restricts the transmission power at NR side.

If the reduction range of the reduced uplink transmission power via the second RAT is higher than a predetermined threshold, or if the reduced uplink transmission power via the second RAT is lower than a predetermined threshold, the control unit may change the transmission power for the re-transmitted random access preamble from a normal transmission power. According to the above arrangement, the user equipment 200 can control the transmission power of the random access preamble to be transmitted upon the initial access in a suitable manner by adjusting the transmission power based on the reduced transmission power at NR side.

Supplemental Remarks on Embodiments

While embodiments of the invention have been described above, the disclosed inventions are not limited to the embodiments, but it could be understood by those skilled in the art that various modifications, corrections, alternatives, replacements, and the like can be made thereto. While specific numerical examples have been used to facilitate understanding of the invention, the numerical values are only an example and any suitable values may be used, unless otherwise specified. The sorting of articles in the above description is not essential to the invention, but details described in two or more articles may be combined for use if necessary, or details of a certain article may be applied to details described in another article (unless incompatible). The boundaries of the functional units or the processing units in the functional block diagrams cannot be said to correspond to boundaries of physical components. The operations of multiple functional units may be performed by a single physical component or the operation of a single functional unit may be performed by multiple physical components. The order of processing discussed in the embodiment may be changed as long as no contradiction occurs. For convenience of explanation, the base station 100 and the user equipment 200 were described using functional block diagrams, but such apparatuses may be implemented by hardware, software, or a combination thereof. Software run on the processor of the base station 100 according to the embodiment of the present invention, and software operating by the processor of the user equipment 200 according to the embodiment of the present invention may be stored in any suitable storage medium such as random access memory (RAM), flash memory, read only memory (ROM), EPROM, EEPROM, register, hard disk (HDD), removable disk, CD-ROM, database, server and the like.

Notification of information is not limited to the aspects/embodiments described in this specification, but may be performed using other methods. For example, the notification of information may be performed physical layer signaling (such as downlink control information (DCI) or uplink control information (UCI)), upper layer signaling (such as radio resource control (RRC) signal, medium access control (MAC) signaling, or broadcast information (master information block (MIB) and system information block (SIB))), other signals, or combinations thereof. The RRC signaling may be referred to as an RRC message and may be, for example, an RRC connection setup message or an RRC connection reconfiguration message.

The aspects/embodiments described in this specification may be applied to systems employing long term evolution (LTE), LTE-advanced (LTE-A), SUPER 3G, IMT-Advanced, 4G, 5G, future radio access (FRA), W-CDMA (registered trademark), GSM (registered trademark), CDMA2000, ultra mobile broadband (UMB), IEEE 802.11 (Wi-Fi), IEEE 802.16 (WiMAX), IEEE 802.20, ultra-wideband (UWB), Bluetooth (registered trademark), or other appropriate systems and/or next-generation systems to which the systems are extended.

The processing sequences, the sequences, and the like of the embodiment/examples described above in this specification may be changed in the order as long as they are not incompatible with each other. For example, in the method described in this specification, various steps as elements are described in an exemplary order and the method is not limited to the described order.

Specific operations which are performed by the base station 10 in this specification may be performed by an upper node thereof in some cases. In a network including one or more network nodes including a base station 100, various operations which are performed to communicate with a user equipment 200 can be apparently performed by the base station 100 and/or network nodes (for example, an MME or an S-GW can be envisaged but the network nodes are not limited thereto) other than the base station 100. A case in which the number of network nodes other than the base station 100 is one has been described above, but a combination of plural different network nodes (for example, an MME and an S-GW) may be used.

The aspects described in this specification may be used alone, may be used in combination, or may be switched with implementation thereof.

The user equipment 200 may also be referred to as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or several appropriate terms by those skilled in the art.

The base station 100 may be referred to as an NodeB (NB), an evolved NodeB (eNB), gNB, abase station, or some other appropriate terms by those skilled in the art.

The terms "determining (determining)" and "deciding (determining)" used in this specification may include various types of operations. For example, "determining" and "deciding" may include deeming that to perform judging, calculating, computing, processing, deriving, investigating, looking up (e.g., search in a table, a database, or another data structure), or ascertaining is to perform "determining" or "deciding". Furthermore, "determining" and "deciding" may include deeming that to perform receiving (e.g., reception of information), transmitting (e.g., transmission of information), input, output, or accessing (e.g., accessing data in memory) is to perform "determining" or "deciding". Furthermore, "determining" and "deciding" may include deeming that to perform resolving, selecting, choosing, establishing, or comparing is to perform "determining" or "deciding". Namely, "determining" and "deciding" may include deeming that some operation is to perform "determining" or "deciding".

An expression "on the basis of ~" which is used in this specification does not refer to only "on the basis of only ~," unless apparently described. In other words, the expression "on the basis of ~" refers to both "on the basis of only ~" and "on the basis of at least ~."

So long as terms "include" and "including" and modifications thereof are used in this specification or the appended claims, the terms are intended to have a comprehensive meaning similar to a term "comprising." A term "or" which is used in this specification or the claims is intended not to mean an exclusive or.

In the entire disclosure, for example, when an article such as a, an, or the is added in translation into English, such an article refers to including the plural unless otherwise recognized from the context.

In the embodiment of the present invention, the initial access control unit 240 is merely an example of the control unit. The initial access configuration unit 140 is merely an example of the configuration unit. LTE is an example of the first RAT. NR is an example of the second RAT.

The present invention has been described in detail. It would be obvious for those skilled in the art that the present invention is not limited to the embodiments described herein. The present invention may be implemented as modification or variation without departing from the spirit and scope of the present invention as defined by the description of the claims. Therefore, the description of the present specification is for illustrative purposes and has no restrictive meaning to the present invention.

EXPLANATIONS OF LETTERS OR NUMERALS

100 Base station
110 Transmission unit
120 Reception unit
130 Configuration information management unit
140 Initial access configuration unit
200 User equipment
210 Transmission unit
220 Reception unit
230 Configuration information management unit
240 Initial access control unit
1001 Processor
1002 Storage device
1003 Secondary storage device
1004 Communication device
1005 Input device
1006 Output device

The invention claimed is:

1. A terminal that communicates with a plurality of base stations in a dual connectivity using a first Radio Access Technology (RAT) and a second RAT, the terminal comprising:
   a control unit configured to, based on a sum of an uplink transmission power via the first RAT and an uplink transmission power via the second RAT, and a power ramping counter, control transmission power of a random access preamble via the second RAT; and
   a transmission unit configured to transmit the random access preamble via the second RAT based on the transmission power of the random access preamble.

2. The terminal as claimed in claim 1, wherein, in a case where the sum of the uplink transmission power via the first RAT and the uplink transmission power via the second RAT exceeds a total maximum transmission power in the dual connectivity, the control unit controls the transmission unit not to transmit the random access preamble, and suspends the power ramping counter.

3. The terminal as claimed in claim 1, wherein, in a case where the sum of the uplink transmission power via the first RAT and the uplink transmission power via the second RAT exceeds a total maximum transmission power in the dual connectivity, the control unit reduces the transmission power of the random access preamble, and suspends the power ramping counter.

4. The terminal as claimed in claim 3, wherein, in a case where the sum of the uplink transmission power via the first RAT and the uplink transmission power via the second RAT exceeds a total maximum transmission power in the dual connectivity and where a reduced amount of the transmission power of the random access preamble exceeds a threshold value, the control unit suspends the power ramping counter.

5. The terminal as claimed in claim 3, wherein, in a case where the sum of the uplink transmission power via the first RAT and the uplink transmission power via the second RAT exceeds a total maximum transmission power in the dual connectivity and where a reduced amount of the transmission power of the random access preamble exceeds a threshold value, the control unit does not transmit the random access preamble.

6. A communication method performed by a terminal that communicates with a plurality of base stations in a dual connectivity using a first Radio Access Technology (RAT) and a second RAT, the communication method comprising:
   controlling, based on a sum of an uplink transmission power via the first RAT and an uplink transmission power via the second RAT, and a power ramping counter, transmission power of a random access preamble via the second RAT; and
   transmitting the random access preamble via the second RAT based on the transmission power of the random access preamble.

* * * * *